July 18, 1961 E. A. SCHONROCK 2,992,856
TILTING MECHANISM WITH AUXILIARY STRUCTURE FOR DUMPING VEHICLES
Filed July 8, 1957 3 Sheets-Sheet 2

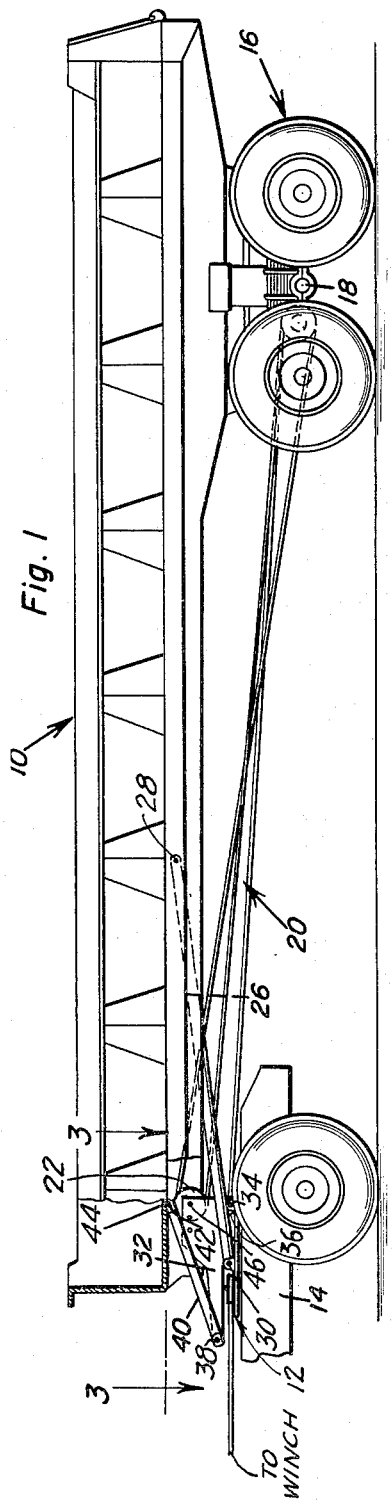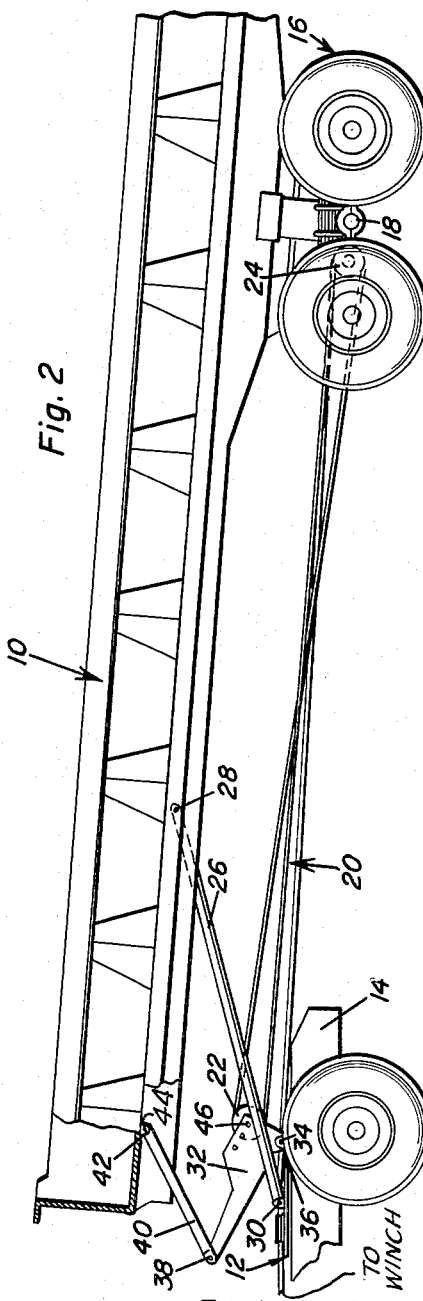
Edwin A. Schonrock
INVENTOR.

Edwin A. Schonrock
INVENTOR.

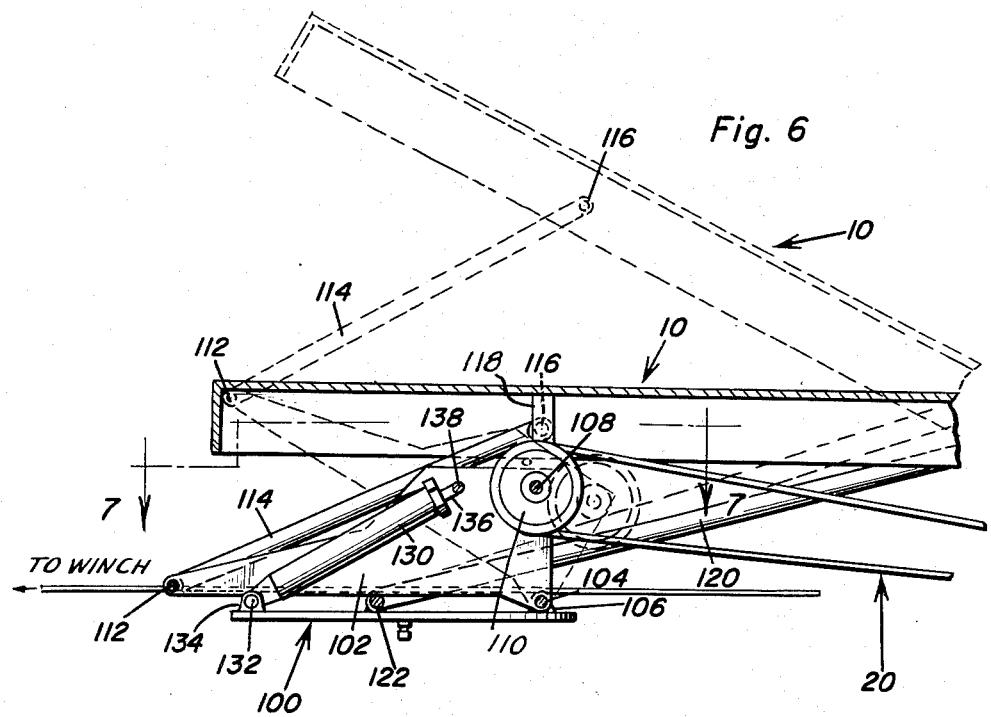
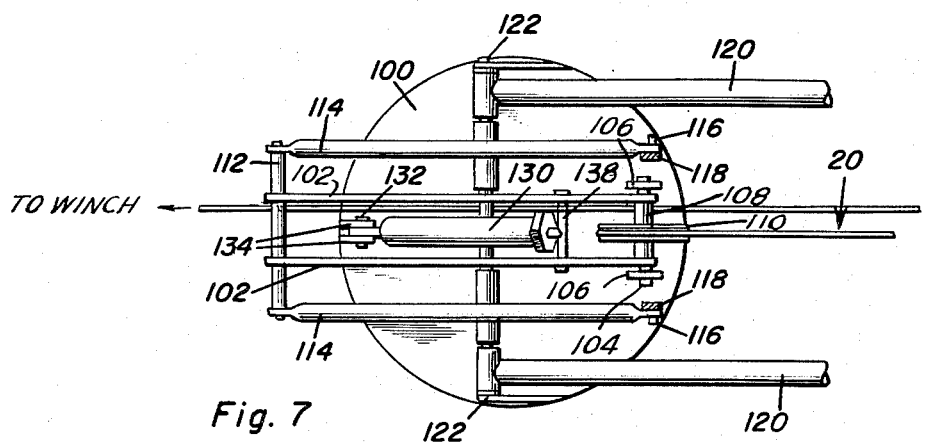

United States Patent Office 2,992,856
Patented July 18, 1961

2,992,856
TILTING MECHANISM WITH AUXILIARY STRUCTURE FOR DUMPING VEHICLES
Edwin A. Schonrock, San Angelo, Tex., assignor to Fruehauf Trailer Company, Detroit, Mich., a corporation of Michigan
Filed July 8, 1957, Ser. No. 670,445
16 Claims. (Cl. 298—20)

This invention comprises a novel and useful booster arm construction for a fifth wheel assembly and more specifically relates to a cable dump trailer wherein there is provided a booster means mounted on the fifth wheel of the tractor-trailer assembly to provide an additional mechanical advantage for elevating the trailer dump body in the initial portion of its dumping operation to thereby relieve excessive strains and peak loads on the lifting mechanism.

The application constitutes subject matter which comprises an improvement over but is similar to subject matter set forth in my prior copending applications Serial No. 433,665, now Patent Number 2,930,653 issued on March 29, 1960, and Serial No. 580,859.

The principal object of this invention is to provide a mechanism, specifically adapted to large truck trailers of the cable dump type, wherein the wheel base of the tractor and trailer combination is shortened by a winch, cable, and pulley system during the vertical tilting movement of the trailer into its dumping position, and provides a booster means whereby a greater mechanical advantage is secured during the initial portion of the dumping operation.

A further important object of the invention is to provide an apparatus in conformance with the preceding object whereby to facilitate the breaking of the angle of repose or the dead center position of the cable lifting mechanism during the initial portion of the lifting operation.

A further important object of the invention resides in the provision of an apparatus in conformance with the preceding objects wherein the upper half of the fifth wheel assembly incorporates therein a booster mechanism providing a mechanical advantage whereby less power from the tractor motor is required to effect the initial portion of the power operated lifting and dumping operation of the trailer.

It is therefore a further purpose of the present invention to provide a mechanism for dump trailers having cable actuating mechanism for elevating the trailer into dumping position, and which will impart an auxiliary lifting or boosting effect to the trailer body during the initial upward tilting of the same from its horizontal loading carrying aposition to a sharply inclined dumping position, whereby to provide a lifting force operating at a relatively high mechanical advantage, until such time as the main or primary cable operated lifting means can operate more effectively at a greater mechanical advantage to complete the lifting operation of the cable to its dumping position.

A further and more specific object of the invention is to provide an auxiliary lift means whereby an increased lifting force is applied to augment the initial lifting movement of a cable dump body.

Yet another object of the invention is to provide a lifting mechanism which may be compactly mounted upon the fifth wheel assembly of the tractor-trailer combination, and whereby there is provided a mechanism for multiplying the range of movement of a fluid pressure operated cylinder whereby to effect the substantially complete lifting of the dump body of the tractor to its dumping position.

The feature about which the foregoing objects of the invention are attained consists of a booster mechanism in the form of a linkage assembly pivotally connected to the fifth wheel and to the trailer together with the conventional cable dump operating mechanism connected to one of the links of this system, the links being so disposed that the initial pull upon the cable will effect straightening of the linkage system and thereby effect the initial portion of the lifting of the body of the trailer, while the final portion of the cable actuation will complete the lifting of the operation primarily under the actuation of the normal lift arms of the mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing portions of a tractor-trailer combination to which the trailer lifting mechanism, in one embodiment has been applied, the tractor vehicle being shown in its horizontal loading carrying position;

FIGURE 2 is a view similar to FIGURE 1 but showing the position of the mechanism during the initial tilting or lifting movement of the dump body of the tractor;

FIGURE 6 is a view similar to FIGURE 5 but showing a further modification in which the hydraulic booster means is effectively combined with the cable actuating mechanism; and FIGURE 7 is a horizontal sectional view taken substantially upon the plane indicated by the section 7—7 of FIGURE 6.

In their more comprehensive form, the principles of the invention are illustrated as being embodied in a tractor-trailer combination of the type in which the entire trailer is lifted at its front end and caused to tilt upwardly about a horizontal axis carried by the rear axle assembly from a substantially horizontal load carrying position to a sharply inclined dumping position. It is to be understood, however, that certain features and principles of this invention are not limited to a tractor-trailer combination in which the entire trailer body is tilted to dumping posiion, but may be embodied in tilting dump bodies.

Figure 3:
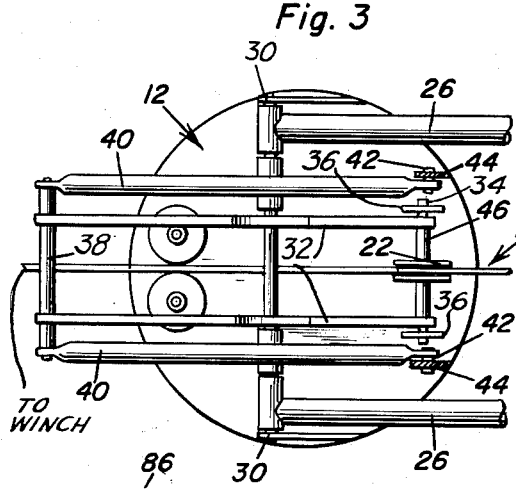
FIGURE 3 is a detailed view taken on a horizontal section substantially upon the plane indicated by the section line 3—3 of FIGURE 1 and showing elements of the booster mechanism associated with the main lifting means of the cable dump trailer.

*Embodiments of FIGURES 1–3*

Referring first to FIGURES 1–3 it will be seen that a trailer designated generally by the numeral 10 has the forward end of its body portion secured to the conventional fifth wheel assembly 12 including a lower plate carried by the rear end of a tractor vehicle 14 and an upper plate pivoted to the lower plate. The rear end of the trailer body is carried by a tandem axle assembly designated generally by the numeral 16 and is adapted and mounted for tilting about an axle or trunnion 18 as will be apparent from FIGURES 1 and 2. The tandem rear axle assembly and the pivotal mounting of the trailer body thereon for tilting movement may be of the construction described and claimed in my prior Patent No. 2,661,236.

In order to elevate the dump trailer 10 from its horizontal load carrying position shown in FIGURE 1 to a sharply inclined tilting dumping position, the initial portion of which is shown in FIGURE 2, there is provded primary tilting and lifting means together with an auxiliary or booster lifting means.

The primary lifting means comprises a cable and pulley system which is indicated generally by the numeral 20 and which includes pulleys 22 and 24 operatively connected to the fifth wheel assembly 12 and to the tandem rear axle assembly, this cable and pulley system being operated by a winch (not shown) but which may be carried by any suitable portion of the tractor 14. In addition, there is included a pair of lift arms 26 having one end of each pivoted as at 28 to the body of the trailer and the other end pivoted as at 30 to a suitable pivotal support upon the fifth wheel assembly 12. Since a primary lifting means of this character may conveniently be of the type shown and described in my prior Patent Nos. 2,661,236; 2,769,662; 2,769,661, and since the details of this primary lifting mechanism and its source of power are not essential to an understanding of the invention as disclosed and claimed herein, a further description of the same is deemed to be unnecessary.

The booster lifting means, however, is mounted upon the upper plate of the fifth wheel assembly and consists of a pair of plates 32 comprising levers which are pivoted as by pivot pins 34 at their lower ends to suitable supporting brackets or lugs 36 carried by the fifth wheel upper plate at the rear portion of the same as will be apparent from FIGURE 3. At their opposite ends, the levers 32 are connected to an axle or pivot pin 38 to which axle is also pivoted a pair of auxiliary lift arms 40 whose upper ends are pivoted as at 42 to suitable lugs or brackets 44 secured to an under portion of the forward end of the truck body.

Journaled between the lower extremities of the levers 32 and offset from the pivot pins 34 thereof is an axle or shaft 46 carrying the above mentioned pulley or pulleys 22.

It will be observed that in the lowered position of the body, the axle 46 and the pulley 22 rest above the pivot pins 34 of the auxiliary lift levers 32. Consequently, when the cable rigging 20 is tensioned as by reeling in the same upon the power winch, not shown, the distance between the pulleys 22 and 24 will be shortened thereby causing the tandem rear axle assembly 16 to approach the tractor 14 and shorten the wheel base of the tractor-trailer combination. During the initial portion of the tensioning of the cable rigging 20, the pull of the cable 20 will be applied to the axle 46, causing an upward pivoting movement of the auxiliary lift arms 32 about their pivot pins 34, from the position shown in FIGURE 1 to that shown in FIGURE 2. During this upward pivoting movement of the booster or auxiliary lift arms, it will be apparent that the linkage formed by the levers 32 and the auxiliary lift arms 40 will initiate the upward tilting movement of the trailer body and thus break the dead center position of the same. Thereafter, continued reeling in of the cable 20 will cause the aforementioned forward movement of the rear axle assembly of the trailer body towards the tractor unit, resulting in an upward tilting movement of the primary or main lift arms 26 from the position shown in FIGURE 1 to that shown in FIGURE 2, and thereafter to the fully lifted position.

It will be apparent that this construction offers a number of advantages over the construction disclosed in my prior copending applications Serial No. 433,665, now Patent Number 2,930,653 issued on March 29, 1960, and Serial No. 580,859. Thus in the present construction an amplified movement is given to the auxiliary or booster lifting means whereby the latter will be operative throughout substantially the entire lifting or tilting operation of the trailer body. Moreover, in the initial lifting portion of the lifting movement, the primary lifting effect will be caused by the booster lifting means which operates at a considerably better mechanical advantage than that of the primary or main lifting mechanism, while during the latter portion of the movement, the main lifting means will be effective for increasing the rate of lifting of the body.

It will be understood that the arrangement will be such as to prevent the pivot pin 38 from at any time moving into alignment with or past the line connecting the pivots 42, 34, in order to prevent a locked toggle effect of the linkage.

Figure 4:
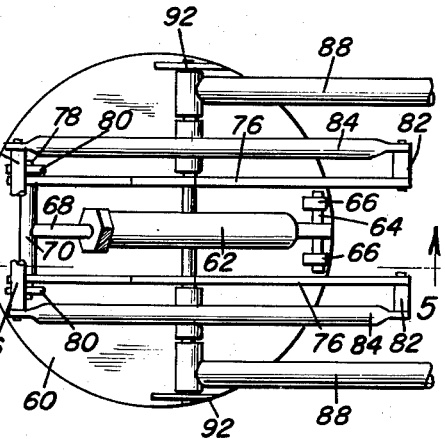
FIGURE 4 is a view similar to FIGURE 3 but showing a modification in which a hydraulically operated booster mechanism is utilized to effect the tilting of the trailer body to its dumping position.
Figure 5:
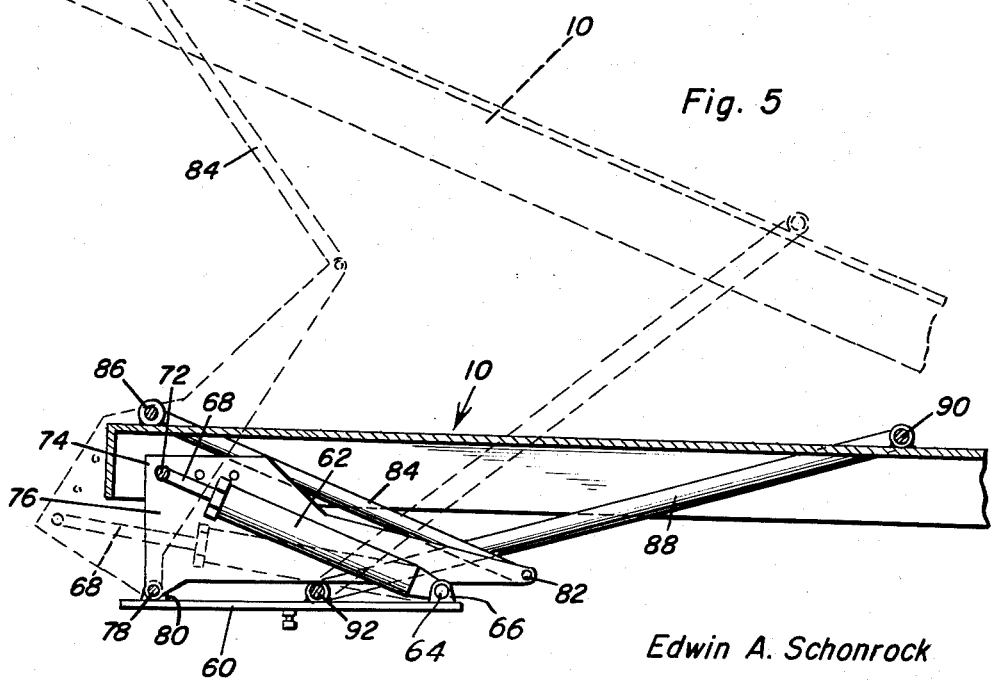
FIGURE 5 is a vertical sectional view taken substantially upon the plane indicated by the section line 5—5 of FIGURE 4 and showing in full and in dotted lines the positions of the mechanism and of the trailer body during the dumping operation of the same.

Embodiments of FIGURES 4 and 5

In the previously described embodiment of FIGURES 1–3, it will be observed that the power operated winch of the tractor vehicle and the cable assembly 20 serve to supply power to both the booster lifting means and the primary or main lifting means.

It is, however, possible to employ a booster lifting means mounted upon a fifth wheel which is entirely powered by fluid pressure such as by hydraulic fluid, in lieu of the previously described cable and pulley assembly. In the embodiment of FIGURES 4 and 5, it will be understood that the same arrangement of a tractor-trailer combination is employed, with the fifth wheel assembly carried by the tractor vehicle being designated by the numeral 60.

A fluid pressure operated cylinder and piston unit 62 is pivoted as by a pivot pin 64 in its lower end to a pair of supporting lugs 66 disposed at the rearward portion of the fifth wheel plate, and in its upper end has its piston rod 68 provided with a cross shaft 70 which is pivotally connected as at 72 to an upstanding portion 74 of the booster or auxiliary lift lever 76 above the pivotal attachment 78 of the lower end of its lift lever to supporting lugs 80 provided at the forward end of the fifth wheel plate.

At its opposite end from the pivot pins 72 and 78, the auxiliary lift lever 74 is provided with trunnions or pivot pins 82 by which the auxiliary lift arms 84 are carried. The other ends of these auxiliary lift arms are pivoted as at 86 to any suitable portion of the forward end of the trailer body 10.

There is also provided in this embodiment the primary lift arms 88 which are pivoted at 90 to the trailer intermediate its ends, and at 92 to the fifth wheel plate 12 intermediate the ends of the latter.

In this embodiment, upon actuation of the hydraulic cylinder and piston unit 62, rotation is imparted to the auxaliary lift levers 74, swinging them upwardly about their forward pivot 78 from the full line lowered position to the dotted line raised position of FIGURE 5, this upward movement through the action of the auxiliary lift arms 84 serving to elevate or tilt the trailer body to its tilting position. During this lifting movement, the primary lift arms 88 serve to rigidify or stabilize the connection between the fifth wheel and the trailer body, while in the lowered position they serve primarily as draft means between the fifth wheel assembly and the tractor vehicle and the trailer.

Embodiments of FIGURES 6 and 7

In the two preceding embodiments of FIGURES 1–3 and FIGURES 4 and 5, the booster mechanism has been actuated by a cable and pulley system, or by a hydraulic actuating means respectively. It is also possible, however, to apply the principle of this invention to a construction which combines the principles of the two prior embodiments. Thus, as shown in FIGURES 6 and 7, the fifth wheel assembly 100 has a pair of auxiliary or booster levers or lift plates 102 pivoted as at 104 to lugs 106 axially of the fifth wheel. Carried by the auxiliary levers 102, above the pivot pins 104, is an axle or shaft 108 having a pulley or pulleys 110 thereon forming part of a cable and pulley system 20 of the type previously set forth. At their other ends, the auxiliary lift levers 102 are provided with a transversely disposed shaft or axle 112 to which are pivoted one end of a pair of auxiliary lift arms 114 whose other extremities are pivoted as at 116 to lugs or brackets 118 secured to the trailer body 10 as previously mentioned. In addition, the main lift arms 120 which are pivoted at their upper ends to the trailer body are also pivoted as at 122 to the fifth wheel forwardly of the previously mentioned pivots 104.

A fluid pressure operated cylinder and piston unit indicated generally by the numeral 130 has its lower end pivoted as at 132 to bifurcated lugs 134 carried by the forward end of the fifth wheel, the piston rod 136 having a cross shaft 138 which is pivoted to the lift levers 102 above and in the same vertical plane with the previously mentioned axle 108 and pivot pins 104.

In this embodiment it will be observed that the initial lifting movement of the trailer is effected by the hydraulic actuating means operating at a mechanical advantage; while the completion of the lifting movement or the latter portion of the lifting movement, including the moving of the trailer towards the tractor is effected primarily by the cable assembly.

It will thus be seen that the embodiments of FIGURES 6 and 7 combines the principles of both of the preceding embodiments.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tractor-trailer combination consisting of a tractor, a trailer, a fifth wheel unit mounted upon said tractor, lift means connected to said fifth wheel and to said trailer for elevating the latter, operating means connected to said lift means for actuating the latter, said lift means including a lift lever pivoted to said fifth wheel unit for swinging about a horizontal axis, a lift arm pivoted to said trailer for swinging about a horizontal axis, a pivot connecting said lift lever and lift arm, said operating means being connected to said lift lever at a position displaced from said pivot for causing swinging movement of the lift lever about its pivotal connection to said fifth wheel unit.

2. The combination of claim 1, including a pair of lift elements pivoted to said fifth wheel and to said trailer and comprising a combined draft means and an elevating means for said trailer.

3. The combination of claim 2, wherein said operating means includes a tension member connected to said trailer and to said lift lever, said operating means decreasing the length of said tension member whereby to effect straightening of said lift lever and lift arm and lifting of said trailer.

4. The combination of claim 3, wherein said operating means comprises actuating pulleys journaled on said lift lever, actuated pulleys journaled on said trailer and a cable reeved through said actuating and actuated pulleys.

5. The combination of claim 1, wherein the pivotal connections of the lift lever to said lift arm and to said fifth wheel are disposed at opposite ends of said lift lever, the pivotal connection of the operating means to said lift lever being disposed between the said pivotal connections and to one side of the line connecting them.

6. The combination of claim 5, wherein said pivot means lies forwardly of the lift lever and the pivot connection of the latter to the fifth wheel lies rearwardly of the lift lever.

7. The combination of claim 1, wherein said operating means includes a tension member connected to said trailer and to said lift lever, said operating means decreasing the length of said tension member whereby to effect straightening of said lift lever and lift arm and lifting of said trailer.

8. The combination of claim 1, wherein said operating means includes a tension member connected to said trailer and to said lift lever, said operating means decreasing the length of said tension member whereby to effect straightening of said lift lever and lift arm and lifting of said trailer, said operating means comprising actuating pulleys journaled on said lift lever, actuated pulleys journaled on said trailer and a cable reeved through said actuating and actuated pulleys.

9. The combination of claim 1, wherein said operating means comprises a fluid pressure actuated cylinder and piston unit pivotally connected to said fifth wheel unit and to said lift lever in spaced relation to said pivot means.

10. The combination of claim 1, wherein said operating means comprises a fluid pressure actuated cylinder and piston unit pivotally connected to said fifth wheel unit and to said lift lever in spaced relation to said pivot means, the pivot means lying rearwardly of the connection of the cylinder and piston unit to the lift lever.

11. The combination of claim 1, wherein said operating means comprises a fluid pressure actuated cylinder and piston unit pivotally connected to said fifth wheel unit and to said lift lever in spaced relation to said pivot means, the pivot means lying forwardly of the connection of the cylinder and piston unit to the lift lever.

12. In a tractor-trailer combination of the type having a tractor with a fifth wheel mounted thereon, a trailer tiltably mounted upon a rear axle assembly and having its forward end adapted to overlie the fifth wheel in normal load carrying position, lift elements pivotally secured at the opposite ends of each to said fifth wheel and to said trailer intermediate the ends of the latter, tension means connected to said trailer and to said fifth wheel for decreasing the distance between said rear axle assembly and said fifth wheel and thereby effect upward tilting of said lift elements and of the front end of said trailer; a lift means interposed between said fifth wheel and trailer and pivotally connected to each, said lift means comprising a lift lever pivoted to said fifth wheel, a lift arm pivoted to said trailer forwardly of the connection of the lift elements to the latter, said lift arm and lift lever being pivoted to each other, the axes of the pivots of said lift arm and lift lever being all horizontal and parallel, said tension means being secured to said lift lever between the pivots of the latter whereby the tensioning of the tension means will effect pivotal movement of the lift lever and lift arm.

13. The combination of claim 12 wherein said tension means includes a first pulley means secured to said trailer, a second pulley means secured to said lift means, a cable reeved through both said pulley means and means for tensioning said cable.

14. The combination of claim 12 including pivot pins journaling and securing said lift lever and arm to each other and to said fifth wheel and said trailer.

15. The combination of claim 12 wherein the place of attachment of said tension means to said lift lever is laterally offset from the line through the pivoted connection of said lever to said fifth wheel and to said left arm.

16. The combination of claim 12 wherein the pivotal connections of the lift arm and lift lever lie in vertical alignment and move vertically with respect to each other.

References Cited in the file of this patent

UNITED STATES PATENTS

| | | |
|---|---|---|
| 188,541 | Reed | Mar. 20, 1877 |
| 908,869 | King | Jan. 5, 1909 |
| 1,188,932 | Griffith | June 27, 1916 |
| 1,744,897 | Hughes | Jan. 28, 1930 |

(Other references on following page)

UNITED STATES PATENTS

| | | |
|---|---|---|
| 1,787,892 | Bordeaux | Jan. 6, 1931 |
| 2,095,286 | Riach | Oct. 12, 1937 |
| 2,137,045 | Day | Nov. 15, 1938 |
| 2,425,853 | Rogers | Aug. 19, 1947 |
| 2,517,933 | Schonrock | Aug. 8, 1950 |
| 2,541,210 | Cunningham | Feb. 13, 1951 |
| 2,549,900 | Frenzel | Apr. 24, 1951 |
| 2,635,919 | Watson | Apr. 21, 1953 |
| 2,637,593 | Schonrock | May 5, 1953 |
| 2,718,431 | Pietroroia | Sept. 20, 1955 |
| 2,794,673 | Haber et al. | June 4, 1957 |

FOREIGN PATENTS

| | | |
|---|---|---|
| 928,624 | Germany | June 6, 1955 |